(12) United States Patent
Knighton et al.

(10) Patent No.: US 10,726,450 B2
(45) Date of Patent: Jul. 28, 2020

(54) COMMERCIAL SHAPE SEARCH ENGINE

(75) Inventors: Mark S. Knighton, Santa Monica, CA (US); David S. Agabra, Pacific Palisades, CA (US); Peter J. DeLaurentis, Los Angeles, CA (US); William D. McKinley, Manhattan Beach, CA (US); Todd C. Moyer, Los Angeles, CA (US)

(73) Assignee: NextPat Limited, Sheung Wan (HK)

( * ) Notice: Subject to any disclaimer, the term of this patent is extended or adjusted under 35 U.S.C. 154(b) by 200 days.

(21) Appl. No.: 13/404,837

(22) Filed: Feb. 24, 2012

(65) Prior Publication Data
US 2012/0158497 A1 Jun. 21, 2012

Related U.S. Application Data

(63) Continuation of application No. 10/911,783, filed on Aug. 3, 2004, now Pat. No. 8,126,907.

(51) Int. Cl.
*G06Q 30/02* (2012.01)
*G06F 16/583* (2019.01)
*G06F 16/951* (2019.01)

(52) U.S. Cl.
CPC ....... *G06Q 30/0269* (2013.01); *G06F 16/583* (2019.01); *G06F 16/951* (2019.01); *G06Q 30/0251* (2013.01)

(58) Field of Classification Search
CPC ......... G06F 17/30056; G06F 17/30554; G06F 17/30277; G06F 17/30; G06F 17/30386; G06F 17/30424; G06F 17/30477; G06F 16/583; G06F 16/951; G06Q 30/0277;
(Continued)

(56) References Cited

U.S. PATENT DOCUMENTS

| 5,659,732 A | 8/1997 | Kirsch |
| 5,751,956 A | 5/1998 | Kirsch |
| 5,855,020 A | 12/1998 | Kirsch |

(Continued)

FOREIGN PATENT DOCUMENTS

WO WO-2004/025508 3/2004

OTHER PUBLICATIONS

Marques, Oge , et al., "Content-Based Image and Video Retrieval, Video Content Representation, Indexing, and Retrieval, a Survey of Content-Based Image Retrieval Systems, CBVQ", *Content-Based Image and Video Retrieval; (Multimedia Systems and Applications Series)*, Kluwer Academic Publishers Group, Boston, USA, vol. 21, (Apr. 1, 2002), Table of Contents, pp. 15-117.

(Continued)

*Primary Examiner* — Dinku W Gebresenbet
(74) *Attorney, Agent, or Firm* — Warner Norcross + Judd LLP

(57) ABSTRACT

Embodiments including a system for searching through a database using two or three dimensional data or data derived from the two three dimensional data. The database may be populated by searching a network environment to compile two dimensional image or three dimensional model data. A search for two or three dimensional data may be utilized to determine related advertisements that may be shown on a results page in connection with the search results. A database being searched may contain pricing data related to products that are associated with two or three dimensional data.

5 Claims, 9 Drawing Sheets

(58) Field of Classification Search
CPC ........... G06Q 30/0251; G06Q 30/0256; G06Q 30/0269
USPC ................. 707/769, 999.102, 957, 706, 722; 705/14.5, 51, 52, 53, 54, 55
See application file for complete search history.

(56) References Cited

U.S. PATENT DOCUMENTS

| | | | |
|---|---|---|---|
| 5,870,546 A | 2/1999 | Kirsch | |
| 5,920,854 A | 7/1999 | Kirsch et al. | |
| 5,963,915 A | 10/1999 | Kirsch | |
| 5,983,216 A | 11/1999 | Kirsch et al. | |
| 5,983,227 A | 11/1999 | Nazem et al. | |
| 5,991,756 A | 11/1999 | Wu | |
| 6,018,733 A | 1/2000 | Kirsch et al. | |
| 6,070,158 A | 5/2000 | Kirsch et al. | |
| 6,112,203 A | 8/2000 | Bharat et al. | |
| 6,138,113 A | 10/2000 | Dean et al. | |
| 6,189,030 B1 | 2/2001 | Kirsch et al. | |
| 6,205,469 B1 | 3/2001 | Graham | |
| 6,216,157 B1 | 4/2001 | Vishwanath et al. | |
| 6,219,671 B1 | 4/2001 | de Vries et al. | |
| 6,230,155 B1 | 5/2001 | Broder et al. | |
| 6,230,158 B1 | 5/2001 | Burrows | |
| 6,266,657 B1 | 7/2001 | de Vries et al. | |
| 6,269,370 B1 | 7/2001 | Kirsch | |
| 6,275,827 B1 | 8/2001 | de Vries et al. | |
| 6,311,189 B1 | 10/2001 | de Vries et al. | |
| 6,317,741 B1 | 11/2001 | Burrows | |
| 6,321,220 B1 | 11/2001 | Burrows | |
| 6,321,265 B1 | 11/2001 | Najork et al. | |
| 6,332,144 B1 | 12/2001 | de Vries et al. | |
| 6,343,302 B1 | 1/2002 | Graham | |
| 6,381,583 B1 | 4/2002 | Kenney | |
| 6,631,364 B1* | 10/2003 | Rioux et al. | |
| 6,701,309 B1* | 3/2004 | Beeferman | ....... G06F 17/30646 |
| 8,126,907 B2* | 2/2012 | Knighton et al. | ............ 707/769 |
| 2002/0072993 A1* | 6/2002 | Sandus | .................. G06Q 30/02 705/26.62 |
| 2002/0107718 A1 | 8/2002 | Morrill et al. | |
| 2002/0169759 A1* | 11/2002 | Kraft et al. | ....................... 707/3 |
| 2003/0009385 A1 | 1/2003 | Tucciarone et al. | |
| 2003/0013951 A1 | 1/2003 | Stefanescu et al. | |
| 2003/0149643 A1* | 8/2003 | Aoki et al. | ........................ 705/27 |
| 2004/0086203 A1 | 5/2004 | Furuhashi et al. | |
| 2004/0249809 A1* | 12/2004 | Ramani et al. | .................... 707/4 |
| 2005/0144069 A1* | 6/2005 | Wiseman et al. | ................ 705/14 |
| 2006/0036577 A1* | 2/2006 | Knighton et al. | ............. 707/3 |
| 2006/0036756 A1 | 2/2006 | Driemeyer et al. | |
| 2006/0088205 A1 | 4/2006 | Choi et al. | |

OTHER PUBLICATIONS

Nextengine, Inc., *Supplementary European Search Report* dated Jan. 20, 2010, EP Appl. No. 05779366.3 filed Mar. 1, 2007, 3 pages.

\* cited by examiner

COMMERCIAL SHAPE SEARCH ENGINE

This patent application is a continuation of application Ser. No. 10/911,783, filed on Aug. 3, 2004, entitled, COMMERCIAL SHAPE SEARCH ENGINE.

BACKGROUND

1. Field of the Invention

Embodiments of the invention relate to searching software and related applications. Specifically, the embodiments of the invention relate to search engines that search two and three dimensional data and data derived from two and three dimensional data or that utilize this data as search parameters.

2. Background

Search engines are applications that are utilized to search through databases to find information stored therein that is specified by input parameters or related to the specified input parameters. A common use of search engines is to search through a compilation of data on a network such as links and text found on web pages. A user specifies a keyword of interest to the user. The search engine iterates through the entries in the compiled database of network information to find matches for the input key word. The search engine compiles the results of the search for display to the user. The results may be displayed in a list that includes a link or location of the found information.

The parameters that a search engine may utilize are ASCII characters and strings of ASCII characters. The search engine compares the character or string with characters or strings in the database. Matches or near matches are returned and prepared for display to the user.

The database utilized by a search engine is populated by manual entry of data or by a 'crawling' process. The crawling process traverses a network and compiles information about web pages on a network. The crawling process compiles text information about each web page. The compiled information is stored in the database to be searched by a user.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
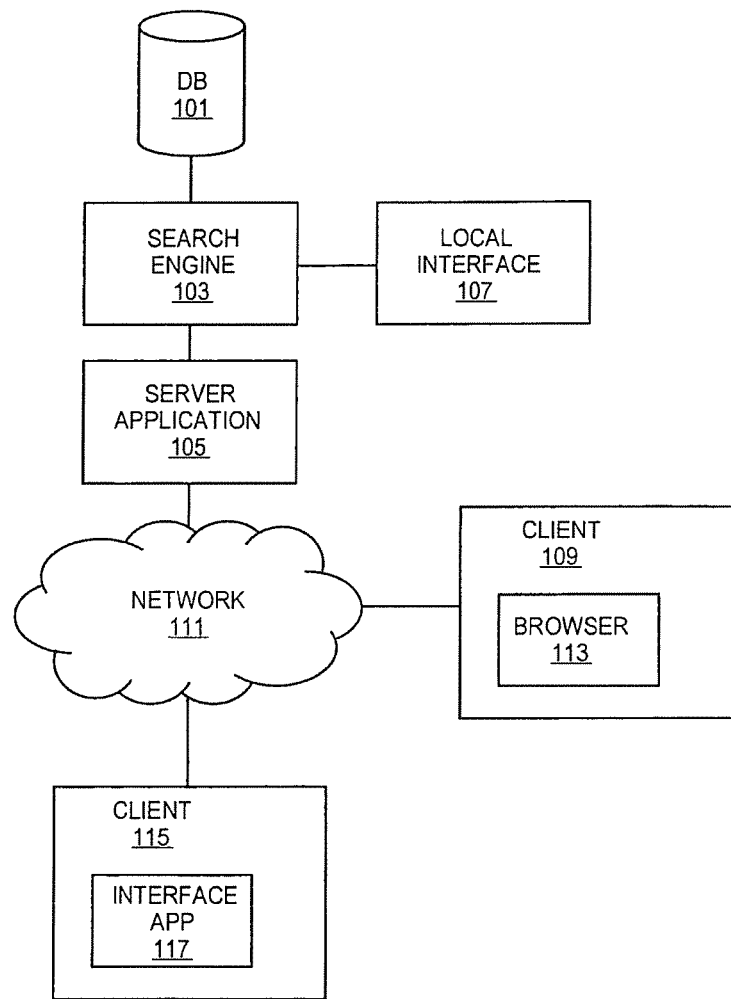
FIG. 1 is a diagram of a distributed system for searching two and three dimensional data.

FIG. 1 is one embodiment of a search engine system. In one embodiment, the search engine system includes a database 101 in communication with a search engine 103. The database 101 may contain data to be searched by the search engine 103. Data stored in database 101 may be records or sets of records. The database 101 may be an object oriented database, relational database, flat file, or similar database system. The database 101 may be located in the same machine as the search engine 103 or in communication with the machine executing the search engine 103. In one embodiment, the database 101 may be distributed over multiple machines in a network.

In one embodiment, the database 101 may store two or three dimensional data or data derived or associated with two or three dimensional data. In one embodiment, the database 101 may store two dimensional data in the form of images, pictures, graphics and similar visual data. The two dimensional image data may be raster type data, e.g. a photograph, or vector type data. In one embodiment, the two dimensional image data may be a texture map of a three dimensional model or object. This two dimensional visual data, may be stored in any format including joint photographic experts group (JPEG), graphics interchange format (GIF), tagged image file format (TIFF), and similar two dimensional graphic formats. In one embodiment, the two dimensional graphic data may be stored along with derived or associated data. Derived data may be information derived from an analysis or processing of the two dimensional data. The derived data may be automatically derived. "Automatically derived" data as used herein refers to data that is the result of an automatic process rather than, e.g., manual measurement or definition by the user. However, where the derivation must be initiated by a user, e.g., pressing the enter key to start clicking a button, or entering derivation parameters before starting, the data may still be deemed automatically derived. Derived data may include statistical information about the two dimensional image, object identification information, attribute data, parametric data and similar derived data. The associated data may be data that is a label, description, tag, or similar data that may be related to the two dimensional image data. In one embodiment, the associated data may be brochures, manuals or similar documentation of a product in a two dimensional image. In one embodiment, the derived or associated data may be in the same record as the two dimensional image or may be in a related record. In one embodiment, derived or associated data may include complementary data.

In one embodiment, the database 101 may store three dimensional data or data derived from or associated with three-dimensional data. Three dimensional data may be stored in the form of a point cloud, polygonal mesh, non-uniform rational B spline (NURB) or similar three dimensional data format. Data derived from the three-dimensional data may be stored in a record of a database including statistical data, object identification data, attribute data, parametric data and similar data derived from the three dimensional data. Data associated with the three dimensional data may include labels, tags, names, descriptions, and similar data associated with the three dimensional data. In one embodiment, the associated data may be brochures, manuals or similar documentation of a product in a three dimensional model. In one embodiment, the derived data or associated data may be in the same record as the three dimensional data or in a related record. In one embodiment, derived or associated data may include complementary data. For example, a three dimensional model may define a mold and derived complimentary data may include an object formed by the mold. In one embodiment, complementary data may include determining the shape of clothes or similar items when worn based on a demonstration model or a model of the shape and size of a user.

In one embodiment, the search engine system may include a search engine 103 capable of accessing and searching through the database 101. Search engine 103 may take three dimensional, two dimensional, text based or similar input types. These input types may be associated with logical operators or similar relational operators. The search engine 103 processes the input and relational operators to generate a set of queries for database 101 to find data that matches or is relevant to the input provided by the user. The matching may include finding three dimensional objects of similar shape, function or attributes or finding two dimensional images with similar colors, internally depicted objects or similar attributes. In one embodiment, whether the search is specified by words, images, three dimensional content or a combination thereof, the search process refers to three dimensional content in evaluating the search. For example, if a search is specified as "red ball" the search process may analyze spectral data and point/mesh data to find information related to that specification. In another embodiment, the search process refers to image data that may or may not form a part of a texture map in evaluating the search. This is to be distinguished from search engines that use captions and keywords rather than an evaluation of the graphical data itself.

The search engine 103 may be accessible by a user through a local interface 107. Local interface 107 may be a specialized application, a generic interface such as a browser application or similar interface. Local interface 107 may allow a user to input search terms, keywords, or similar descriptive text. The local interface 107, in one embodiment, may also allow a user to input or import two dimensional images and three dimensional data as search terms. Local interface 107 may allow the user to specify attributes, characteristics, relational operations including logical operations, two and three dimensional associated or derived data or similar information, or any combination of this data and information.

In one embodiment, the search engine 103 may be accessible over a network 111. The search engine 103 may be accessible via remote clients 109, 115. In one embodiment, the search engine 103 may be made available through a server application 105. The server application 105 may facilitate communication between a search engine 103 and client 109, 115. Server application 105 may receive input search terms from clients 109, 115, and return result information from the search engine 103 to the clients 109, 115. In one embodiment, the server application 105 may be a web server application that formats the searching engine interface and results as a web page.

In one embodiment, the client 109 may have a general user interface for communicating with the search engine. In one embodiment, the general interface may be a browser application 113. In another embodiment, the client 115 may have a dedicated interface application 117 to facilitate communication with the search engine 103.

In one embodiment, the search engine may utilize a profile of information about the user. This profile may be used to supplement the search specification provided or adjust results returned. In one embodiment, the profile may be created by direct input of the user. In another embodiment, the profile is automatically generated based on prior searching activities, including searches conducted and responses to results returned. In one embodiment, the profile may be stored local to the server providing the search engine 103. In another embodiment, the profile may be stored local to the client and sent to the search engine with a query.

Network 111 may be any type of communication system. Network 111 may be a local area network (LAN), wide area network (WAN), e.g., the Internet, or similar communication system. Search engine 103 and clients 109, 115 may communicate using network communication protocols including HTTP, telnet, FTP or similar network communication protocols.

Figure 2:
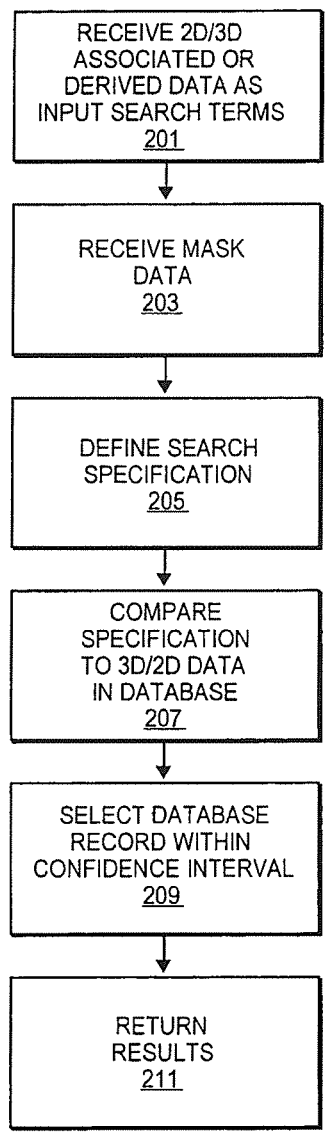
FIG. 2 is a flowchart of one embodiment of a process for searching.

FIG. 2 is a flowchart of one embodiment of the process for searching a database based on two dimensional, three dimensional, associated or derived data. In one embodiment, the search engine receives two dimensional, three dimensional, associated or derived data from a local or remote interface (block 201). In one embodiment, the data may be a type of two dimensional image such as a photograph or similar digital image. The data may be in any graphical format including GIF, TIFF, JPEG, or similar data. In one embodiment, any type of three dimensional data may be input including polygonal mesh, NURB, point cloud data or similar three dimensional data. Three dimensional data may be of any type or known three dimensional format including Initial Graphics Exchange Specification (IGES) format or similar formats. Additional input data may be text data including ASCII characters and ASCII based strings. Text data or other data may be descriptive data for two-dimensional or three-dimensional data.

In one embodiment, mask data may also be submitted. A mask is a data construct that defines a set or type of data to be excluded from a larger data set. In this context, a mask may designate certain aspects, geometry, attributes or similar elements of a two dimensional image or three dimensional model associated or derived data to be ignored while forming or executing a search. Thus, while three dimensional digital content is generally deemed to include the surface image of the object, also referred to as the texture map, in some cases only the shape is important as part of the search specification. For example, if a user inputs a three dimensional model of a chair as an input to search for similar chairs, a user may mask specific features of the chair to exclude these features from the search. For example, this tool may be utilized to find chairs having the same shape but having different coloration or ornamental factors. In one embodiment, mask data may be input or defined by a user of the search engine (block 203). For example, a user may be permitted to highlight a portion of an image or a model that is to be masked (or retained) within the specification of the search. In another embodiment, mask data may be set automatically by a search engine administrator or user, determined based on an analysis of input data or similarly determined. In one embodiment, a target of the search may be an object that is within a raster image or photographic image. This object may be identified using edge detection or similar object identification techniques. The portion of the image that does not contain the target search object may then be masked in generating the specification for the search.

In one embodiment, the search engine combines the mask data and input data to form a search specification (block 205). The search specification may include two dimensional data, three dimensional data, associated data or derived data. The search specification may be formatted as a search query. This query may be formed in any query language or format. The query may be in a structured query language (SQL) or similar language. In another embodiment, no mask data may be utilized or supported and the search specification may be generated based on the input data.

This query may be applied to the database to find matching data in the database. In one embodiment, the search through the database may include comparing the specification to two dimensional or three dimensional data in the database (block 207). Comparing three dimensional and two dimensional data search terms to data in the database may include making a point by point analysis or comparison of a two dimensional image or three dimensional models in the specification with images and models in the database or similar comparison between two and three dimensional data. For example, a comparison of two dimensional image data in a specification to two dimensions image data in the database may include a pixel by pixel comparison. A three dimensional comparison may include a point by point comparison of a point cloud model or similar model. The process of comparing data in two and three dimensional form may involve converting the data to other formats to facilitate the comparisons. The data in the specification may be converted into a format of the data in the database and vice versa. In another embodiment, data in both the database and the specification may both be converted to a standardized format to facilitate comparisons.

In one embodiment, a comparison between the specification data and data in the database may include a comparison of two dimensional data with three dimensional data and three dimensional data with two dimensional data. In one embodiment, a comparison of three dimensional data may be made with an object depicted in a two dimensional image. These comparisons may include an analysis of data derived from the three dimensional and two dimensional data. Derived data from the two and three dimensional data may be compared to two and three dimensional derived data in the database.

In one embodiment, the comparison of specification data with the data records of the database may include comparisons of two and three dimensional data with derived and associated data or various combinations of this data. The types of comparative analysis of the data may include comparison and analysis of dimensional data, type data, size data, spectral reduction, wavelet coefficient extraction, surface smoothness analysis, geometric feature identification, directional orientation normalization, material properties analysis (for example, determining the reflectivity of a surfaces), pattern detection (including template matching for texture maps), colorization, edge/boundary identification, color segmentation analysis, histogram analysis of color or intensity, three dimensional layering analysis, feature analysis, spherical decomposition and similar methods of comparing and analyzing two and three dimensional data, as well as, combinations of these methods.

In one embodiment, a comparison in a search may require that a confidence interval be met before an entry in a database may be selected to be returned as a matching search result (block 209). In one embodiment, a confidence interval may define a degree of similarity that is necessary for a result to be considered a match. For example, a confidence interval may be defined to require a 75 percent to 100 percent match. The confidence interval may be applied to specific elements of a database record that is being analyzed or compared with a specification. For example, two dimensional or three dimensional data in the specification may need to have geometry that matches the data in the database within the defined interval to determine that the compared data has a similar shape. The confidence may define a degree of variance in the shape, color, size or other attributes of a two dimensional image, three dimensional model of an object or similar data. In one embodiment, a user may define a confidence interval. In another embodiment, a confidence interval may be derived from analytical specification of database data. Separate confidence intervals may be defined for different data types, records, attribute or similar data categories.

In one embodiment, a search complexity level may also be specified. A search complexity level may define an amount of time spent, depth or other similar characteristics of the search that is to be performed. For example, a low search complexity may result in a comparison of the gross form of three dimensional objects to determine if they are approximately the same shape by comparing a minimal number of points. A high search complexity may compare most or all points of three dimensional objects and include an analysis of the variance between points.

In one embodiment, a matching process may include comparing a specification to an index. An index may be an organization of data in a database according to categorization, ranking or similar organization of database data. For example, the data records for compiled web data may be indexed based on the number of links that were found to the data or the web page containing the data. In one embodiment, the similarity of the specification with the data base records may be scored and ranked. The scoring may be based on any number of specified criteria or categories defining possible similarities between the specification data and the database records data. Scoring criteria may include geometric, texture, coloration and similar elements of two and three dimensional data that may be compared. For example, a model or image that is part of a specification may have a high match score with a database record having a similarly shaped or colored image or model.

In one embodiment, data records that match the search terms may be returned to a user (block 211). The data records may be sorted according to the percentage of match, score of the match or ranking of the match with the specification submitted to the search engine. An interface of the search engine may display results in a table or similar format. The search results may include a visual depiction of the two and three dimensional data of returned records. The interface may provide controls for manipulating the perspective of the two dimensional image and three dimensional model. Associated data and derived data may also be supplied to a user with the results. In one embodiment, a user must specify which of the derived or associated data may be displayed.

Figure 3:
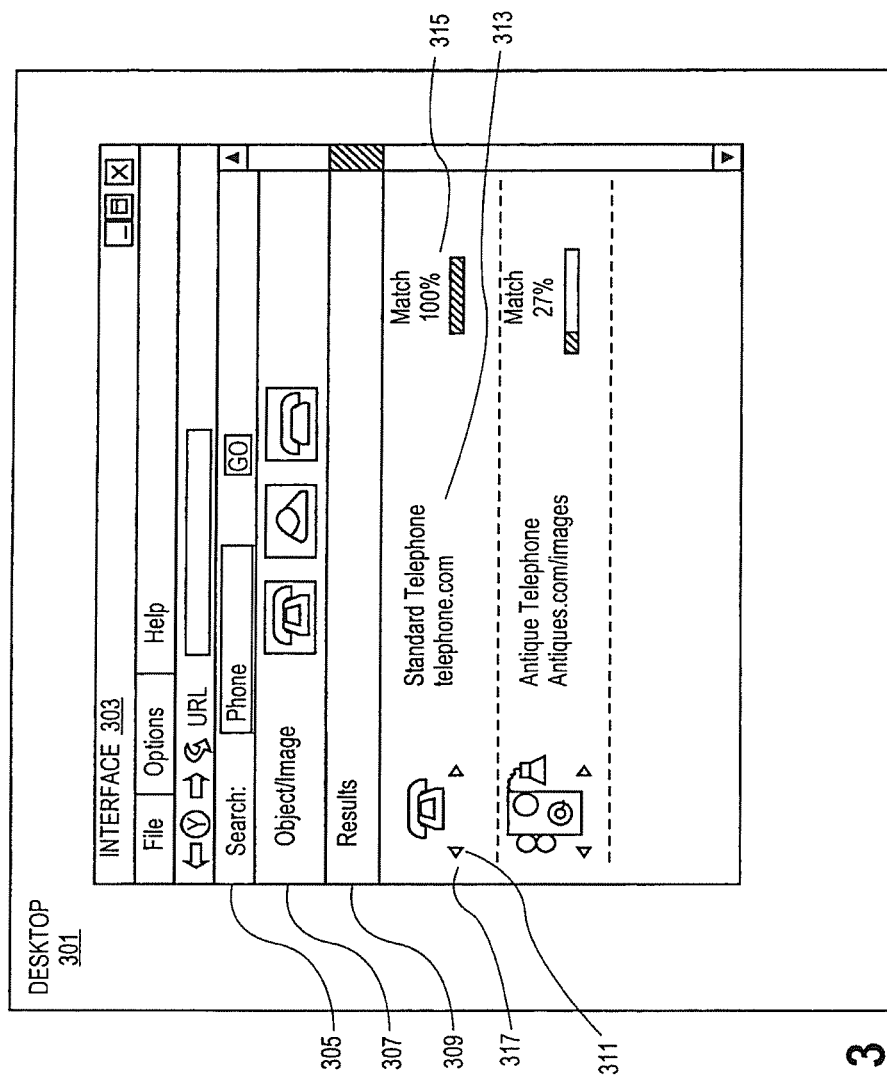
FIG. 3 is a diagram of one embodiment of an interface for a two or three dimensional data search engine.

FIG. 3 is a diagram of one embodiment of a user interface for the search engine. In one embodiment, the search engine may be executed on operating systems such as Microsoft Windows, OS X by Apple Computer, Inc. or similar operating system. The operating system may provide a windows based environment or command line based environment to support interaction with the search engine and interface. In one embodiment, the operating system will provide a desktop or similar work space for interface applications.

In one embodiment, the interface may be a graphical user interface 303. The graphical user interface may provide the conventional options provided by an application such as file options and navigation options. In one embodiment, the user interface 303 will provide a field 305 to allow a user to input search terms such as keywords or similar search terms or descriptions. In one embodiment, the user interface 303 will provide a field 307 for a two dimensional image or three dimensional model to be imported as a search term. The two dimensional image or three dimensional model data may be imported from a file system, imported through a capture device, receiver or a similar source. The two dimensional image or three dimensional model data may also be obtained or input as a result from a previous search.

In one embodiment, after a search has been completed, a result section 309 may be generated to be displayed to a user. In one embodiment, the result section may include the display of a set of data records. A data record may include an image or object 311, associated or derived information 313 and information regarding the match with the search terms or specification. In one embodiment, similar three dimensional models or two dimensional images may be grouped into a single results entry. The related data for each may be presented in the same entry space.

In one embodiment, controls 317 may be provided to manipulate the two dimensional image or three dimensional model. In another embodiment, the two dimensional image or three dimensional model may be manipulated directly with a mouse or similar input device. The mouse or input device may be utilized to alter the point of view of the image or model by selecting the image or model and dragging the image or model or providing similar directional input. The directional input may be used to move the image or model, rotate the image or model or zoom in or out on the image or model.

Figure 4:
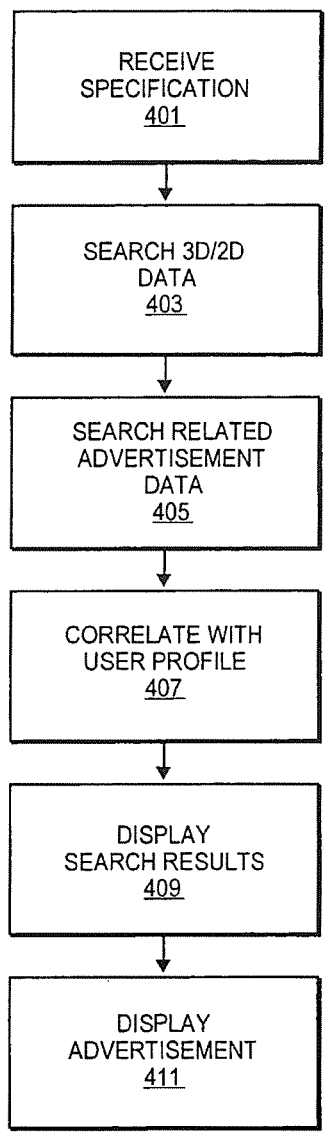
FIG. 4 is a flowchart of one embodiment of a process for searching two or three dimensional data and providing a related advertisement.

FIG. 4 is a flowchart of one embodiment of the process for generating related advertising with searches involving two or three dimensional image data. In one embodiment, the search engine may receive input defining a specification through user interface or for other application (block 401). The search engine may parse or similarly analyze the specification to generate a query defining the search of the primary database. The search engine may then be applied to the database (block 403). In one embodiment, after or during the search of the database, a search may also be initiated to search in an advertisement database for advertisements related to the primary search (block 405). In one embodiment, the search of the advertisement database may analyze the specification or a subset of the specification to generate a query appropriate to find related advertisements. In another embodiment, the search of the advertisement database may be based on the results of the search of the primary database. The results may be analyzed to generate a query appropriate to find related advertisements. In one embodiment, two dimensional and three dimensional specification data, results data or derived and associated data may be compared to the advertisement database to find matching records. In one embodiment, the advertisement database may be a discrete database with separate management. In another embodiment, the advertisement database may be part of the same database management system as the primary database. In a further embodiment, a search of the primary database may return links or similar indicators to locations in the advertisement database that contain associated data such as associated advertisements.

In one embodiment, matching during the search of the advertisement database may be based on the correlation between the specification or results information and each record of the advertisement database. An advertisement with a high correlation with the specification or results may be selected to be displayed through the user interface. In another embodiment, a set of advertisements may be selected that have a high correlation with the specification data or results data. Each advertisement on the set of advertisements may each be shown over time. In one embodiment, the advertisements with a high correlation may be filtered based on additional criteria. Additional criteria may include a ranking of advertisers based on their per advertisement payment schedule or similar criteria.

In one embodiment, the matching advertisement data may be correlated with a user profile data (block 407). A user profile may include prior search history, preferences of a user or similar data related to the behavior or actions of a user. User profile information may be used to further filter the returned advertisement data to select an advertisement likely to have a high level of interest to the user based on past user search history and actions and the current specification search. In another embodiment, the search specification may be modified based on an analysis of a user profile. Additional terms may be added, relational operators modified, aspects of the specification masked or deleted or similar modifications made to a search specification based on a user profile. For example, a user profile may indicate an age of a user and the search may be adjusted to return age appropriate materials.

In one embodiment, the search results and advertisement results may be returned to a user interface. The user interface may then format the search results to be displayed (block 409). The user interface may then format a returned advertisement or set of advertisements for display (block 411). The user interface may display multiple returned advertisements, a single advertisement, or may rotate advertisements or similar display methods may be used. In one embodiment, the display mechanism may be a pop-up window, a frame in a larger window, a banner or similar advertisement mechanism or combination of these mechanisms. In another embodiment, the advertisement may appear concurrent with the search results. In one embodiment, the advertisement may include a promotional graphic, promotional text, a link to promotional materials or similar content. In another embodiment, the advertisement and constituent promotional materials may be inserted into the search results. In one embodiment, a promotional email may be generated based on a search and sent to the user that generated a search.

Figure 5:
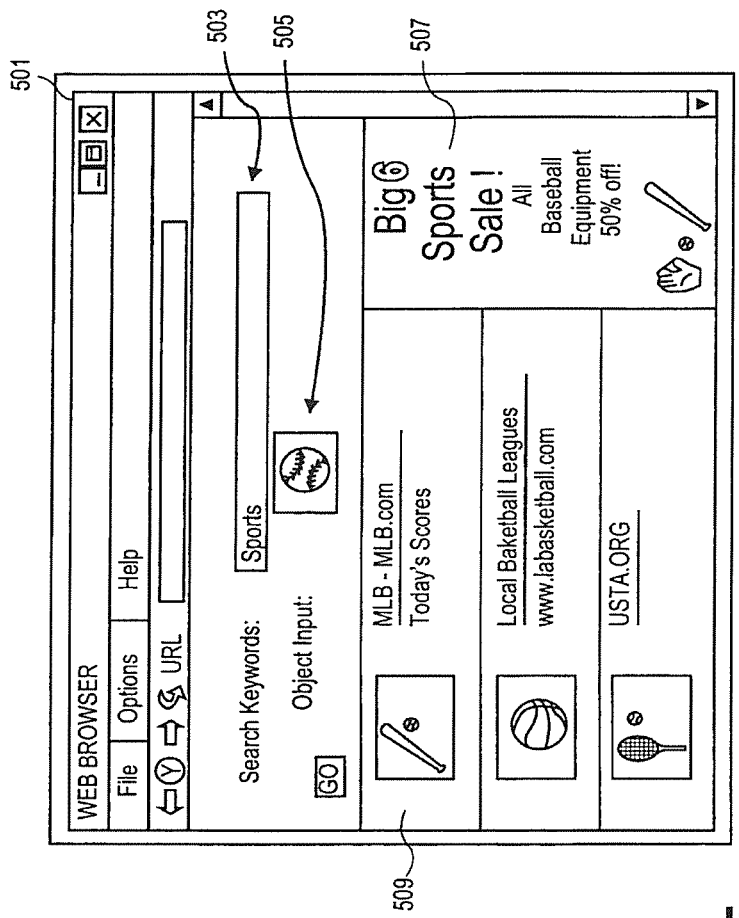
FIG. 5 is a diagram of one embodiment of a user interface for a search system that provides related advertising.

FIG. 5 is a diagram of one embodiment of a user interface including an advertisement based on the search criteria. In one embodiment, the user interface 501 may be operating in the standard window or desktop provided by a conventional operating system environment. The user interface may be a specialized interface or general interface such as a web browser 501. In one embodiment, the user interface provides a search term field 503 and image or model input field 505. The user may specify keywords, images and objects which the user desires to be part of the specification for a search. After a search is conducted, a set of results 509 may be displayed for a user. In one embodiment, a portion of the user interface may be reserved for displaying an advertisement 507. The advertisements may be selected based on the input search terms, objects and images. In one embodiment, the advertisement 507 may be in an inset frame. In another embodiment, the advertisement may be a pop up window, banner or similar advertising mechanism. A single advertisement or set of advertisements may be displayed. The advertisements may be a static or animated advertisement. Advertisements may include sound, images, three dimensional models, streaming video data and similar audio visual elements.

Figure 6:
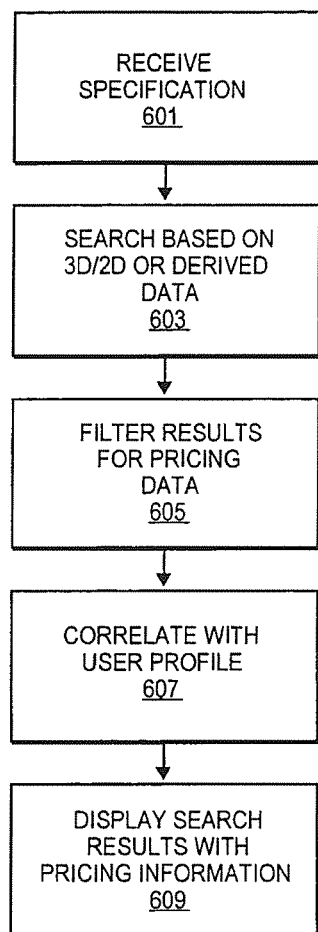
FIG. 6 is a flowchart of one embodiment of a process for searching two or three dimensional data associated with pricing information.

FIG. 6 is a flow chart of one embodiment of a process for searching for product price data. In one embodiment, the search engine may receive a set of input data defining a specification through a search interface (block 601). The input data may include search terms in the form of text, strings, attributes, relational operators or two dimensional and three dimensional data. In one embodiment, the input data may specify a price or bid amount. In another embodiment, the input may include multiple prices or ranges of prices.

In one embodiment, the specification data may be formatted for searching a primary database. The specification may be constructed to constrain a search for records relating to items for sale. In another embodiment, the primary database may be constructed to contain records relating primarily to items for sale. The primary database may be searched based on the specification which may include three dimensional model data or two dimensional image data or data associated with or data derived from the three dimensional and two dimensional data (block 603). A set of data records in the database may be returned that meet a threshold or confidence interval. This set of data records may be filtered based on a derived or associated pricing data (block 605). Data records that have pricing data that falls outside the designated price range for the search may be excluded from the data set. In another embodiment, the results may be filtered based on an approximated price or range of a product designated in a specification. In one embodiment, the results may be ranked based on price and if the number of records exceeded a defined limit, higher or lower priced records may be filtered to reach a desired total return count. Similar filtering criteria based on derived price ranges, quantities, qualities and similar criteria may be applied to search results.

In one embodiment, the results may be further filtered based on factors associated with a user profile (block 607). Results data may be further filtered based on prior user searches, purchases, search history and similar user profile data that may indicate desired record and be returned in connection with the current search.

In one embodiment, the search results may be returned to a user interface to be displayed (block 609). The search results displayed through the user interface may include pricing data associated with each returned record information. Pricing information may be separated out as a record, separate row or column, highlighted or similarly marked as product pricing information related to the data entry.

Figure 7:
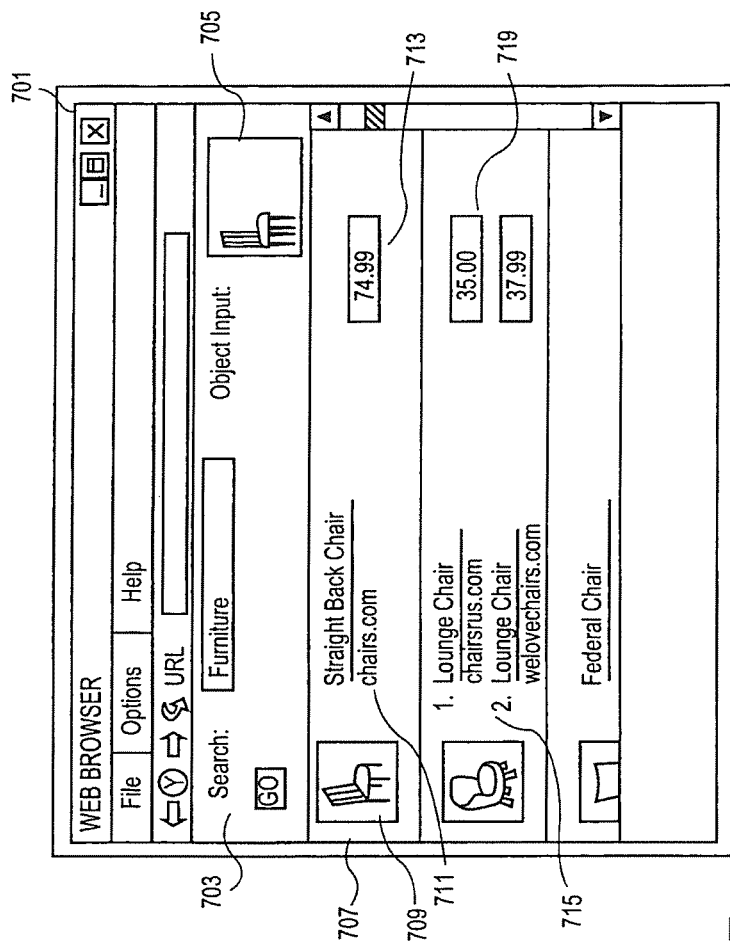
FIG. 7 is a diagram of one embodiment of a user interface for the price searching engine.

FIG. 7 is a diagram of one embodiment of a user interface for a search engine that provides price data. In one embodiment, the user interface may operate in the standard windows or desktop environment or command line environment. In one embodiment, the user interface may be a specialized application or general user interface such as a browser 701. In one embodiment, the interface may provide standard navigation options and file options. In one embodiment, the user interface may provide a search field 703 to allow a user to specify text or strings to be utilized in a specification for a search of a database. In one embodiment, the user interface may include an image or model input field 705 to allow a user to specify a two dimensional image or three dimensional model or set of images or models to be part of a search specification.

In one embodiment, the user interface provides a display space for search results 707. The search results may include two dimensional images and three dimensional model data 709, associated data or derived data 711 and pricing data 713. In one embodiment, the user interface may provide a set of tools for altering the display system. The tools may include options and setting for changing search criteria, window sizes, displayed field selection and similar settings and options. In one embodiment, the user interface may provide a set of controls to manipulate the view of the image or model data. The related derived data may include an indication of the location of the object related to the pricing data 713. Each record in the result may display a single price or may display multiple prices. In one embodiment, similar three dimensional models or two dimensional images may be grouped into a single results entry. The related data for each may be presented in the same entry space 715. Likewise, the price data for each member of the group may be displayed in a single result entry 719. The grouping may be utilized to facilitate the shopping experience of a user by categorizing and organizing a large number of records returned by the search engine. In one embodiment, this feature may be utilized only when a the large number of records are returned or when multiple entries of an image, model or associated product are returned.

Figure 8:
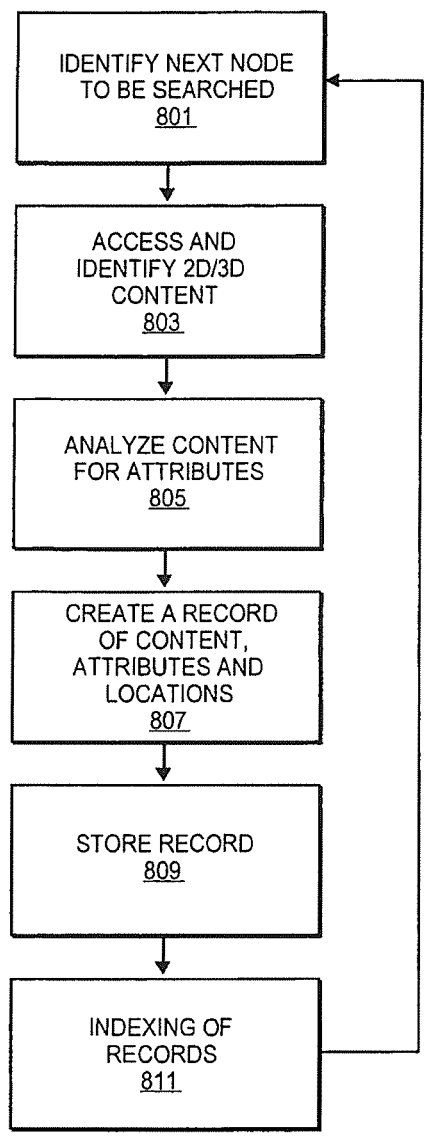
FIG. 8 is a flowchart of one embodiment of a crawling process.

FIG. 8 is a flowchart of one embodiment of a process for populating a database with information including three dimensional model or two dimensional image data. In one embodiment, the population process may be a search process or 'crawling' process that searches through nodes or resources in a network or similar communication system looking for data to be catalogued and stored for use in a subsequent database related search. This technique may be used to improve the efficiency of a search by creating a catalogue of resources or information available on a network or similar communication system. This system allows a user searching for information or a resource on a network to avoid performing a real time search of the network communication systems which has a long processing time and may tie up system resources.

In one embodiment, the process may begin by identifying a first node or a set of nodes to be searched (block 801). This first node may be designated by a user, administrator automatically detected over a network system or determined in similar methods. In one embodiment, the first node will be detected by automatic means such as traversing the Immediate neighbors on a network of the machine executing the crawling process. The process looks for unmapped data resident on the node. As used herein, "unmapped data" is any data that has not previously been processed by the system.

In one embodiment, the crawling process accesses the first node and identifies the content of the node (block 803). In one embodiment, the database being populated may catalogue web based data and the associated crawling process seeks and identifies a web server on the first node. The process may identify each image, three dimensional model, associated data or similar data on each node. In one embodiment, each image or three dimensional model, may be analyzed to determine the attributes or other data associated with the image or model (block 805). For example, an image on a node may have a label or description text embedded in a web page which may be collected and compiled by a crawling process. Other attributes of interest may include dimension, gross geometry, shape, spectral qualities or other distinguishing features suitable for use in filtering a search. In one embodiment, collected data may be combined to create a record including an image or model and associated content attributes (block 807). In one embodiment, this record may be structured according to a scheme or similar system of a database to be utilized by a search engine. Each record may be stored in the database or other suitable resources or the distributed network (block 809). The data stored may include a link to the node containing the image or model, a link to the image or model on the node, a copy of the image or model or similar data related to or derived from the image or model. In one embodiment, the records may be subsequently or concurrently indexed (block 811). In one embodiment, the node may be ranked based on some objective criteria such as the number of links to that node. This ranking may be used to influence ordering of search results when data from this node is returned as a search result.

Figure 9:
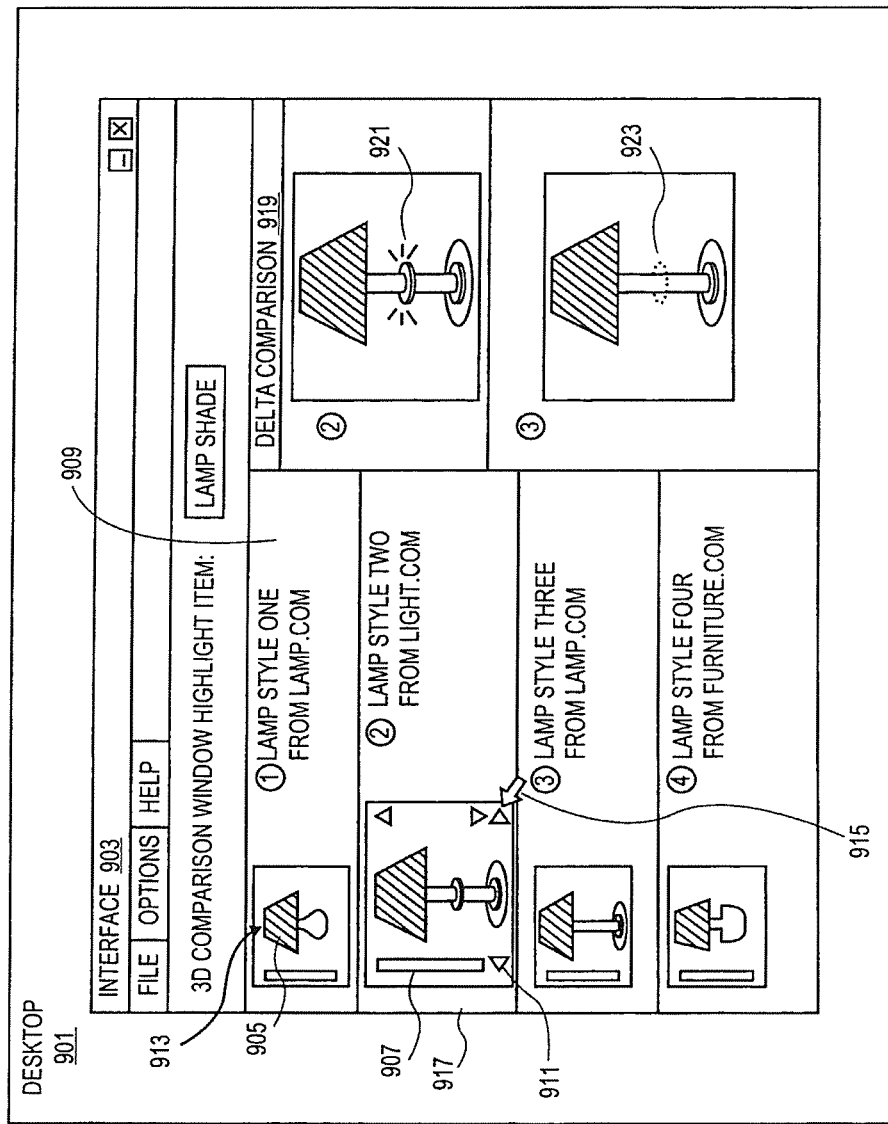
FIG. 9 is a diagram of one embodiment of a specialized presentation application.

FIG. 9 is one embodiment of a specialized presentation application for facilitating the viewing of three dimensional data. In one embodiment, the three dimensional data may be data returned by a search engine or similar system. The presentation application may operate in a standard operating system environment including a windowing system, command line interface or similar environment. In one embodiment, the presentation system may be a specialized application 903 or a plug-in or similar program for a general interface application such as a browser application. In one embodiment, this functionality is integrated into the search engine such that the presentation features are supported by any standard browser without additional software.

In one embodiment, a set of models may be displayed as thumbnails, full scale models or similar visual display of models. The set of models to be viewed may each be normalized to a standard perspective and viewing size. In one embodiment, the viewing perspective may be indicated 913 in each display or in relation to each display. A modification of the perspective of one displayed model may alter the perspective the entire set or a subset of the displayed models.

In one embodiment, the display of a model may be accompanied by associated or derived data 909. The set of models may also be displayed in a ranked order, grouped, scored order or may be similarly organized. The associated or derived data may include links to further associated or derived data including related websites, shopping interfaces and similar resources.

In one embodiment, the presentation application 903 may allow a user to adjust the perspective of the displayed models. The presentation application 903 may include a set of controls 911 to adjust the zoom as well as the right, left, up, down and rotational orientation of the model. Adjusting the orientation of one model may adjust the orientation of the other models. In one embodiment, a single set of controls for controlling the perspective and orientation of all the models may be provided. In another embodiment, individual controls may be provided for each displayed model. Each model may rotate as the controls are activated or the models may snap to the new orientation or perspective. In another embodiment, no visible controls may be presented, but the modes may be manipulated by an input device such as a mouse or similar directional input device. For example, the models may be rotated by dragging the mouse over the model.

In one embodiment, each displayed model may include a size indicator 907. The size indicator may demonstrate the relative size of each of the models for the purpose of comparison. The size indicator may have a known or standard size that is scaled in relation to each model to visibly demonstrate the scale of each displayed model in relation to the other displayed models or in relation to a known measurement or standard.

In one embodiment, the presentation application 903 may support highlighting 905 of portions or subcomponents of a displayed model. For example, if a set of lamp models are displayed a user may select to highlight the lampshade from each model. The presentation system may present a set of options such as subcomponents for highlighting or a user may indicate, e.g. by pointing, a feature of a model to be highlighted. An indicated feature may be highlighted in each of the displayed models.

In one embodiment, the presentation application 903 may be accessed and manipulated using a pointer such as a mouse pointer 915 or similar pointing or graphic interface mechanism. The presentation application may track the location of the pointer and adjust the focus, zoom or rotation of a displayed model or subcomponent of a displayed model when the pointer passes over that model or subcomponent.

In one embodiment, a user may select a single model or set of models to view the models in greater detail or to further compare the set of models. In one embodiment, the presentation application 903 may support a delta comparison 919 of the set of selected models. A delta comparison may highlight or visually demonstrate the differences or similarities between selected models. For example, a user may select two lamp models for a delta comparison. A first model may have a ring ornamentation in the midsection of its post while a second model lacks this feature. The delta comparison may highlight 921 or similarly draw attention to the ring feature of the first model. Alternatively or in combination with highlighting, the delta comparison may indicate the location of missing features by outlining, shading or similarly indicating the location of a missing feature. In another embodiment, highlighting, shading or similar indicator mechanisms may be utilized to display the features shared between selected models.

In one embodiment, the search engine may be implemented in software and stored or transmitted in a machine-readable medium. As used herein, a machine-readable medium is a medium that can store or transmit data such as a fixed disk, physical disk, optical disk, CDROM, DVD, floppy disk, magnetic disk, wireless device, infrared device, and similar storage and transmission technologies.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
accepting an original specification via a distributed network the specification including at least one of three dimensional digital content and data that is automatically derived from three-dimensional digital content;
comparing the specification with data from other three dimensional digital content, the data residing in a database linked to the distributed network, to find records that at least partially match the specification;
reviewing the found records to identify words that are associated with the found records, the words not present in the original specification; and
conducting a search using the words to find information related to the words.

2. The method of claim 1 wherein the three dimensional digital content includes information relating to an image of a surface of a subject of the content.

3. The method of claim 1 further comprising:
accessing previously recorded information from a user profile relating to a user specifying the search; and
modifying at least one of the search process and the specification using the previously recorded information.

4. The method of claim 1 wherein using the search process comprises at least one of:
a comparing the specification to an index;
scoring the similarity of the specification to entries in a database;
creating a list of search results based on the scoring; and
sorting search results according to relevancy.

5. A method comprising:
accepting an original specification via a distributed network the specification including at least one of three dimensional digital content and data that is automatically derived from three-dimensional digital content;
comparing the specification with data from other three dimensional digital content, the data residing in a database linked to the distributed network, to find records that at least partially match the specification;
collecting words from the database that are associated with the found records, the words not present in the original specification;
formulating a search query using the words collected from the other three dimensional content; and
conducting a search to find information related to the words.

\* \* \* \* \*